(12) United States Patent
Fan et al.

(10) Patent No.: US 6,242,506 B1
(45) Date of Patent: Jun. 5, 2001

(54) FLAME RETARDANT ADDITIVE FOR RADIATION CURABLE ACRYLIC COMPOSITIONS

(76) Inventors: Mingxin Fan, 49 Sheffield La., West Chester, PA (US) 19380; Gary W. Ceska, 310 Long Ridge La., Exton, PA (US) 19341; James Horgan, 805 Copeland School Rd., West Chester, PA (US) 19380

( * ) Notice: Subject to any disclaimer, the term of this patent is extended or adjusted under 35 U.S.C. 154(b) by 0 days.

(21) Appl. No.: 09/120,508

(22) Filed: Jul. 22, 1998

(51) Int. Cl.$^7$ .................................................. C08G 18/67
(52) U.S. Cl. ............................. 522/93; 560/83; 560/183; 528/49; 528/73; 526/301; 252/609
(58) Field of Search .................. 560/83, 183; 522/93; 528/49, 73; 526/301; 252/609

(56) References Cited

U.S. PATENT DOCUMENTS

| | | | |
|---|---|---|---|
| 3,891,596 | 6/1975 | Roberts et al. ........................ | 523/523 |
| 3,925,335 | * 12/1975 | Kuehn ................................... | 522/93 |
| 3,929,929 | * 12/1975 | Kuehn ................................... | 528/75 |
| 4,139,577 | 2/1979 | Kuehn ................................... | 525/33 |
| 4,170,711 | 10/1979 | Orlando et al. ........................ | 568/610 |
| 4,208,502 | * 6/1980 | Stackman et al. .................... | 526/292 |
| 4,543,418 | * 9/1985 | Rodgers et al. ...................... | 549/562 |
| 4,631,148 | * 12/1986 | Braksmayer et al. ................ | 252/609 |
| 5,281,682 | 1/1994 | Cornforth et al. .................... | 526/273 |

FOREIGN PATENT DOCUMENTS

| | | |
|---|---|---|
| 1034380A | 8/1989 | (CN) . |
| 1-287120 | 11/1989 | (JP) . |
| 2-80412 | 3/1990 | (JP) . |
| 2-123143 | 5/1990 | (JP) . |
| 3-55237 | 3/1991 | (JP) . |
| 3-182515 | 8/1991 | (JP) . |
| 8-157732 | 6/1996 | (JP) . |
| WO 96/35754 | 11/1996 | (WO) . |

OTHER PUBLICATIONS

Yang, Chin–Ping, and Wang, Sheng–Sung, "Syntheses of 4–Methacryloxy–2,3,5,6–tetrabromobenzyl Phosphonates and Effects of Flame Retardancy on Their Co–PMMA", Journal of Polymer Science: Part A: Polymer Chemistry, vol. 27, 3551–3567 (1989).

Guo, Wenjeng, "Flame–Retardant Modification of UV–Curable Resins with Monomers Containing Bromine and Phosphorus", Journal of Polymer Science: Part A: Polymer Chemistry, vol. 30, 819–827 (1992).

Utevski, Dr. Lev, "Improved flame retardant systems for polypropylene", Popular Plastics & Packaging, Feb. 1996, pp. 47–50.

* cited by examiner

*Primary Examiner*—Rachel Gorr
(74) *Attorney, Agent, or Firm*—Cozen & O'Connor; Michael B. Fein

(57) ABSTRACT

Radiation curable acrylic compositions are improved with regard to flame resistance by incorporating a reactive compound which is the reaction product of tetrabromophthalic anhydride or acid and a (meth)acrylic compound.

11 Claims, No Drawings

FLAME RETARDANT ADDITIVE FOR RADIATION CURABLE ACRYLIC COMPOSITIONS

BACKGROUND OF THE INVENTION

1. Field of the Invention

This invention relates to the field of radiation curable compositions, and specifically to imparting flame resistance or redardancy to such compositions and the coating, adhesives, and the like, which are the cured products of such compositions.

2. Description of the Prior Art

Radiation curable compositions are a rather recent innovation in the field of coatings and adhesives. The use of ultraviolet (UV) and electron beam (EB) technology is growing rapidly because of the low or zero volatile organic chemical emissions (VOC) obtainable through such technology, and also due to the ability to achieve high productivity. The most popular radiation curable chemistry is based on (meth)acrylates (a convention used herein to refer to both acrylates and methacrylates).

As the field of radiation curable chemistry has developed, there have been several proposals for additives to impart flame resistance, which is a serious need, especially in applications such as airplane and motor vehicle construction, electrical and electronic applications. Bromine and phosphorus-containing additives have been proposed, but so far no one has proposed a commercially acceptable additive which is compatible with the radiation curable compositions, and also reacts with the composition upon cure so as to form an integral part of the cured polymer, and which can not be extracted or otherwise rendered inactive, which is frequently the case with non-reactive bromine or phosphorus based additives. Examples of such non-reactive additives brominated dialkyl phthalate, dioctyl tetrabromophthalate, brominated styrene polymers, and brominated Bisphenol A compounds. The assignee of this application formerly produced a polymerizable fire/flame retarding material under the designation SR640, which was an ethoxylated tetrabromobisphenol A diacrylate. That material was difficult to make, and also suffered from the disadvantage of having very low solubility in typical acrylate monomers and/or oligomers used in radiation curable chemistry.

It has accordingly become an object of this invention to provide a flame retardancy additive for radiation curable compositions which is compatible and reacts with the other components of such compositions.

SUMMARY OF THE INVENTION

These objects, and others which will become apparent from the following disclosure, are achieved by the present invention which in one aspect comprises a compound useful as a reactive additive which imparts flame resistance to radiation curable compositions based on (meth)acrylates which is the reaction product of tetrabromophthalic anhydride or acid and a (meth)acrylic compound.

In another aspect, the invention comprises radiation curable compositions containing such novel flame retardant compound.

Another aspect is a method of providing flame retardancy to such compositions, and one further aspect is the adhesives or coatings which result from radiation curing such compositions.

DETAILED DESCRIPTION OF THE INVENTION

The radiation curable compositions which are made flame resistant according to the invention are any which are known in the art. These compositions usually comprise an oligomer which may be blended with a monomer, and are generally used for coatings and adhesives. The oligomers generally fall into three broad groups of resin, namely epoxy-acrylates, polyester acrylates and polyurethane acrylates.

The epoxy-acrylates include the beta-hydroxy esters which are generated by the reaction of acrylic acid or methacrylic acid with an epoxy resin or epoxy-novolak resin. The polyester acrylates consist of polyesters which have been esterified with acrylic acid to yield a polyester with acrylate ester terminal groups, using well established esterification techniques. The polyurethane acrylates consist of reaction products of a hydroxy-containing acrylate ester, usually 2-hydroxy ethyl acrylate or hydroxy propyl acrylate with an isocyanate prepolymer.

The monomers which are blended with the above acrylic oligomers in order to yield a practical radiation curable formulation in the presence of a suitable photo initiator fall into three groups defined by functionality, and may be mono-, di- or multi-functional.

Multi-functional monomers, usually with a functionality of 3 or 4, generally consists of acrylate esters of trifunctional or tetrafunctional alcohols. Commonly used materials include glycerol triacrylate, trimethylol propane triacrylate, trimethylol ethane triacrylate, pentaerythritol tetracrylate, together with the acrylates of the ethoxylates or propoxylates of the above alcohols.

Difunctional monomers consist usually of the acrylate esters of ethylene glycol or propylene glycol and their oligomers, with tripropylene glycol diacrylate being especially preferred, diacrylates of longer chain alcohols such as hexanediol diacrylate and acrylate esters of cycloaliphatic diols such as the cyclohexane diols.

Monofunctional monomers consist of the acrylate esters of mono functional alcohols such as octanol, nonanol, decanol, dodecanol, tridecanol and hexadecanol both in their linear and branch chain forms. Also included are cyclohexyl acrylate and its alkyl derivatives such as t-butylcyclohexyl acrylate and tetrahydrofurfuryl acrylate. N-vinylpyrrolidone has also been used as a monofunctional monomer.

High functionality monomers give rapid cure speeds and high cross-link density, leading to films of high hardness and tensile strength with excellent chemical resistance. Monofunctional monomers, conversely, give slow cure speeds and low cross-link density, leading to cured films of lower hardness, tensile strength, and with reduced chemical resistance.

"Epoxy-acrylates" are the beta-hydroxy esters which are generated by the reaction of acrylic acid or methacrylic acid with an epoxy resin. Suitable epoxy resins are the resinous products generated by reaction of Bisphenol-A or Bisphenol-F with epichlorohydrin, and consist of a range of materials including liquid and solid resins of varying molecular weights. Especially preferred are the liquid Bisphenol A-epichlorohydrin condensates with a molecular weight in the range of from 300–600. The description "epoxy-acrylate" may also be applied to reaction products of acrylic acid or methacrylic acid with epoxy-novolak resins, that is resin obtained by reaction of epichlorohydrin with a phenol or cresol formaldehyde condensate, and which contain a plurality of glycidyl ether groups with an epoxy functionality greater than 2. Also included are the comparatively low viscosity epoxy acrylates obtained by reaction of epichlorohydrin with the diglycidyl ether of an aliphatic diol or polyol. Examples of materials which may be reacted with acrylic or methacrylic acid include hexanediol diglycidyl ether, neopentyl glycol diglycidyl ether and butanediol diglycidyl ether.

The polyester acrylates consists of polyesters as defined and described in the above description which have been esterified with acrylic acid to yield a polyester with acrylate ester terminal groups, using well established esterification techniques.

Polyurethane acrylates consist of reacting products of a hydroxyl containing acrylate ester, usually 2-hydroxy ethyl acrylate or hydroxy propyl acrylate (1-methyl, 2-hydroxy ethyl acrylate) with an isocyanate prepolymer. Such a prepolymer consists of the reaction products of a polyol, which may be a polyether polyol or a polyester polyol, with a di or polyisocyanate. Suitable polyether polyol include for example polyethylene glycols, polypropylene glycols, ethoxylated or propoxylated glycerol or ethoxylated or propoxylated glycerol or ethoxylated or propoxylated trimethylol propane or trymethylol ethane, all of which may have molecular weights in the range of about 1000 to about 6000. Suitable di or polysocyanates include the aromatic isocyanates such as toluene di-isocyanate or di phenyl methane di-isocyanate, aromatic diisocyanates such as tetramethyl xylylene di-isocyanate, and aliphatic or cycloaliphatic di-isocyanates such as isophorone-di-isocyanate, bis-isocyanate cyclohexyl methane, hexa-methylene di-isocyanates and alkyl substituted hexa-methylene di-isocyanates.

Suitable polyester polyols, which may be reacted with the above range of di or poly isocyantes, include hydroxy terminal polyesters obtained from a wide range of di and poly functional carboxylic acids and a wide range of di and poly functional alcohols. Suitable acids include adipic, sebacic, glutaric and azelaic acids, the isomeric phthalic acids, trimellitic acid and pyromellitic acid. Suitable polyols include for example ethylene and propylene glycols and their oligomers, cyclohexane diols and their ethoxylates and propoxylates, and higher functionality polyols such as glycerol, trimethylol propane and trimethylol ethane and their ethoxylates and propoxylates. Also included are polycaprolactone polyols.

The composition, containing the photo initiator, is applied to the surface of a substrate and subsequently exposed to a radiation source until an adherent dry polymerized film is formed on the substrate. The composition is useful for placement on a wide range of substrates including paper, rigid and flexible plastics, metallic substrates, cement, glass, asbestos products, wood and the like.

The flame retardant compositions of the invention are generally compatible with the other monomers and oligomers of the radiation curable composition, possibly due to the non-symmetric nature of their molecular structure, and so they are generally soluble and homogeneous. The flame retardant compositions of the invention are preferably liquids or to low melting point solids. These new bromine containing (meth)acrylates are free radically polymerizable and can be UV/EB cured free radically.

The tetrabromophthalic anhydride reactant is readily available, and the corresponding acid is also readily available or can be easily prepared from the anhydride by reaction with water, of course.

The flame retardant compositions of the invention preferably have two (meth)acrylate groups which are derived from a meth(acrylic) reactant.

Preferred (meth)acrylic compounds for reaction with the tetrabromophthalic anhydride or acid are (meth)acrylic acid, hydroxyethyl (meth)acrylate, hydroxypropyl (meth) acrylate, hydroxybutyl (meth)acrylate, polyester modified hydroxyalkyl (meth)acrylates, hydroxypoly(propylene oxide) (meth)acrylates, and hydroxypoly(ethylene oxide) (meth)acrylates.

The compound can be prepared by first reacting the tetrabromophthalic anhydride or acid with an alkylene diol to form a diester diol, and then reacting the diester diol with a half adduct formed by reacting a diisocyanate with a hydroxyalkyl(meth)acrylate.

Any diisocyanate can be used, and it may be possible to use a tri or tetraisocyanate. Preferred diisocyanates are toluene diisocyanate, isophorone diisocyanate, hexamethylene diisocyanate, and trimethylhexamethylene diisocyanate.

The half adduct can be prepared by reacting the di (or higher) isocyanate with the hydroxyalkyl(meth)acrylate in the presence of tin catalyst. The most common tin catalyst is dibutyl tin dilaurate. Preferably two equivalents of isocyanate per equivalent of hydroxy are used so as to form a half ester which has both (meth)acrylate and isocyanate functionality. If an excess of isocyanate is used, the excess does not react with hydroxy but is carried over so as to form a mixture of the diisocyanate and the half ester. The excess diisocyanate reacts with the diester diol so as to chain extend it into an oligomer or polymer, while at the same time the half ester reacts with some hydroxy groups of the diol and stop the growth of the polymer chain. Thus, as those familiar with polymer chemistry would appreciate, the ratio of diisocyanate to half ester controls the molecular weight of the resultant polymer compound which comprises two (meth) acrylate groups, unless a trifunctional isocyanate was used, in which case more than two (meth)acrylate groups are present.

The reactions can be carried out at 25 to 125° C. in the presence of catalysts. Suitable catalysts for the urethane reaction are typically metal and amine based, for example, ammonium halide catalysts, tin octates, tin oxide and dibutyl tin dilaurate. The reaction between half ester and alcohols can be carried out in the presence of acid catalysts such as sulfuric acid, p-toluenesulfonic acid, and methanesulfonic acid.

An alternative method of preparing the flame retardant additive compounds of the invention is by first reacting the tetrabromophthalic anhydride or acid with a hydroxyalkyl (meth)acrylate to form a half ester, followed by reacting the half ester with a either a diglycidyl ether to form a dimer having two (meth)acrylate groups, or with a monoglycidyl ether to form a mono(meth)acrylate compound in which the second acid group is converted into ester groups.

Suitable diglycidyl ethers are ethylene glycol diglycidyl ether, butanediol diglycidyl ether, bisphenol A diglycidyl ether, and polypropylene glycol diglycidyl ethers. Suitable monoglycidyl ethers include phenyl glycidyl ether, butyl glycidyl ether, ethyl glycidyl ether, and propyl glycidyl ether, for example.

For the reaction between the glycidyl group and the acid group of the tetrabromo compound, catalysts such as trimethylbenzyl ammonium chloride, triethylbenzylammonium bromide, chromium acetate, triphenyl phosphine can be used.

The flame retardant compositions of the invention can be incorporated in the radiation curable composition by normal mixing or dissolving in an amount which is enough to provide the desired flame retardancy. Such amounts will vary, of course, depending on the molecular weight and number of bromine units, as well as the degree of compatibility and effect on the cured coating of adhesive. Suitable percentages of inclusion are 2% to 90% of the total formulation.

The cured coatings or adhesives are prepared by normal radiation techniques, i.e., UV or EB, as are well known in the art. The invention is especially applicable to coatings and adhesives for electrical and electronic applications, as well as airplanes and automobiles, where flame retardancy is required.

The following examples are presented to illustrate a few, non-limiting, embodiments of the invention.

EXAMPLES

Example 1

Preparation of Epoxy Acrylate 0.75 g of 4-methoxyphenol, 463.7 g of tetrabromophthalic anhydride, 174.0 g of hydroxyethyl acrylate were charged into a reactor and air sparge was applied while the mixture was stirred. The mixture was heated to 100° C. when an exotherm was noticed which resulted in the temperature increase to 109° C. After the temperature stablized at 100° C., 3.0 g of triphenylphosphine was added and another exotherm was observed with peak temperature at 112° C. The reaction was carried out at 100° C. for 5 hours when 132.0 g of butanediol diglycidyl ether was added. The mixture was reacted at 110° C. for 3.0 hours when the reaction shot down. A viscous resin was obtained with the following properties: Acid value- 2.43 mgKOH/g; epoxy value- 0.45 mgKOH/g; color-G 4.6; clarity- clear; viscosity at 60° C.–14,350 cps.

Example 2

Preparation of Urethane Acrylate

To a reactor, 0.73 g of dibutyltin dilaurate, 0.64 g of 4-methoxyphenol, and 222.0 g of isophorone diisocyanate were charged. The mixture was stirred and air sparge was applied while stirring. 116.0 g of hydroxyethyl acrylate was added slowly to the stirring mixture. The mixture was stirred at 60° C. for 4 hours, then 266.0 g of the reaction product of tetrahydrophthalic anhydride and a mixture of ethylene and propylene glycols, available commercially from Great Lakes Chemical Company as "PHT4-diol," was added and the temperature was increased to 95° C. The reaction was kept at 95° C. for 4 hours before discharge. The viscous liquid become solids upon cooling to room temperature.

Example 3

Preparation of Urethane Acrylate

To a reactor, 0.73 g of dibutyltin dilaurate, 0.12 g 4-methoxyphenol, 132.8 g of hexanediol diacrylate, and 222.0 g isophorone diisocyanate were charged. The mixture was stirred for 30 minutes while air sparge was applied to dissolve the inhibitor. Then 116.0 g of hydroxyethyl acrylate was added slowly over one hour followed by addition of 266.0 g PHT4-diol. The reaction was carried out at 95° C. for 6.0 hours. A clear light yellow viscous resin was obtained with 60C viscosity of 8000 cps.

While the invention has been described and exemplified in great detail, various alternatives, modifications, and improvements should become apparent to those skilled in the art, which are to be considered as within the spirit and scope of the invention as set forth in the following claims.

What is claimed is:

1. A compound useful as a reactive additive which imparts flame resistance to radiation curable compositions formed by reacting (A) a diester diol which is the reaction product of tetrabromophthalic acid or anhydride with alkylene diol; and (B) the reaction product of a diisocyanate and a hydroxyalkyl (meth) acrylate.

2. A compound useful as a reactive additive which imparts flame resistance to radiation curable compositions based on (meth)acrylates, said compound comprising at least two (meth)acrylates, a polyester, and at least two tetrabromophthalic units (structures).

3. A compound useful as a reactive additive which imparts flame resistance to radiation curable compositions based on (meth)acrylates containing at least one tetrabromophthalic unit (structure) wherein, said compound is free of phosphonate and is formed by reacting diester diol derived from tetrabromophthalic anhydride with a diisocyanate and a hydroxyalkyl (meth)acrylate.

4. The compound according to claim 1 wherein said diisocyanate is selected from the group consisting of toluene diisocyanate, isophorone diisocyanate, hexamethylene diisocyanate, and trimethylhexamethylene diisocyanate.

5. The compound according to claim 2 wherein said compound is formed by first reacting tetrabromophthalic anhydride or acid with a hydroxyalkyl (meth)acrylate to form a half ester, followed by reacting said half ester with a diglycidyl ether to form a dimer comprising two (meth)acrylate groups.

6. The compound according to claim 5 wherein said diglycidyl ether is selected from the group consisting of ethylene glycol diglycidyl ether, butanediol diglycidyl ether, and bisphenol A diglycidyl ether.

7. The compound according to claim 3 wherein said diisocyanate is selected from the group consisting of toluene diisocyanate, isophorone diisocyanate, hexamethylene diisocyanate, and trimethylhexamethylene diisocyanate.

8. A compound useful as a reactive additive which imparts flame resistance to radiation curable compositions based on (meth)acrylates containing at least one tetrabromophthalic unit (structure) wherein said compound is formed by first reacting a tetrabromophthalic anhydride or acid with a hydroxyalkyl (meth)acrylate to form a half ester, followed by reacting said half ester with a diglycidyl ether to form a dimer comprising two (meth)acrylate groups.

9. The compound according to claim 1 wherein said (B) is a mixture of said diisocyanate and half adduct formed by reacting said diisocyanate with a hydroxyalkyl(meth) acrylate.

10. The compound according to claim 8 wherein said diglycidyl ether is selected from the group consisting of ethylene glycol diglycidyl ether, butanediol diglycidyl ether, and bisphenol A diglycidyl ether.

11. A compound useful as a reactive additive which imports flame resistance to radiation curable compositions based on (meth)acrylates containing at least one tetrabromophthalic unit (structure) wherein said compound is in the form of a polymer formed by first reacting diester diol derived from tetrabromophthalic anhydride or acid with a mixture of a diisocyanate and half adduct formed by reacting said diisocyanate with a hydroxyalkyl (meth)acrylate, said compound being free of phosphonate.

* * * * *